United States Patent
Kurtin et al.

[11] Patent Number: 5,999,328
[45] Date of Patent: Dec. 7, 1999

[54] LIQUID-FILLED VARIABLE FOCUS LENS WITH BAND ACTUATOR

[76] Inventors: Stephen Kurtin, 3835 Kingswood Rd., Sherman Oaks, Calif. 91403; Daniel E. Fedele, 3007 N. Arlington Ave., Simi Valley, Calif. 93063; Saul Epstein, 14558 Deervale Pl., Sherman Oaks, Calif. 91403

[21] Appl. No.: 08/336,170

[22] Filed: Nov. 8, 1994

[51] Int. Cl.⁶ .................................................. G02B 1/06
[52] U.S. Cl. .......................................................... 359/666
[58] Field of Search .............................................. 359/666

[56] References Cited

U.S. PATENT DOCUMENTS

| | | | |
|---|---|---|---|
| 504,890 | 9/1893 | Ohmart | 359/666 |
| 1,269,422 | 6/1918 | Gordon | 359/666 |
| 3,598,479 | 8/1971 | Wright | 351/159 |
| 4,444,471 | 4/1984 | Ford, Jr. et al. | 359/676 |
| 4,514,048 | 4/1985 | Rogers | 359/676 |
| 4,913,536 | 4/1990 | Barnea | 359/666 |
| 5,124,734 | 6/1992 | Barnea | 351/169 |
| 5,138,494 | 8/1992 | Kurtin | 359/666 |
| 5,229,885 | 7/1993 | Quaglia | 359/665 |
| 5,371,629 | 12/1994 | Kurtin et al. | 359/666 |

FOREIGN PATENT DOCUMENTS 258325  9/1926  United Kingdom.

OTHER PUBLICATIONS

Definition of 'buckling'; "The American Heritage Dictionary–Second College Edition," Houghton Miffler, Boston, 1982.

*Primary Examiner*—Georgia Epps
*Assistant Examiner*—Evelyn A. Lester
*Attorney, Agent, or Firm*—Saul Epstein

[57] ABSTRACT

An actuating system for liquid-filled variable focus lenses of the type where the focus is adjusted by changing the spacing between a rigid lens and a distensible membrane. The actuating system involves a finger-operated positioner which drives an elongated flexible actuating member, i.e., a thin band, which is supported in a channel to prevent buckling. The band drives one or more actuating mechanisms which are located around the periphery of the lens and which provide a mechanical advantage so that the motion of the finger-operated positioner is in a comfortable range.

27 Claims, 3 Drawing Sheets

LIQUID-FILLED VARIABLE FOCUS LENS WITH BAND ACTUATOR

BACKGROUND OF THE INVENTION

Liquid-filled variable focus lenses wherein one or both lens surfaces are caused to change shape by a change in liquid pressure have been known for over a century. Such lenses have been proposed for use, for example, in spectacles to provide a "reading addition" for people suffering from presbyopia. This application normally involves a composite lens in which a person's distance prescription (if any) is provided by a conventional rigid plastic or glass lens, and a variable additional power is provided by a liquid-filled lens. Three diopters is the theoretical maximum amount of added optical power needed to move the focal point of a spectacle lens from infinity to reading distance.

There have been a number of basic approaches to the design of liquid-filled variable focus lenses over the last one hundred years. In 1893, Ohmart disclosed a "Device for Reflecting and Refracting Radiant Energy" which included a pair of parallel transparent elastic plates or membranes, with the space between them filled with liquid (U.S. Pat. No. 504,890). By pumping liquid into and out of the space between the membranes, the membranes were caused to bow, and hence create a variable power lens, i.e., one with a variable focal length. This principle has been applied to lenses used in spectacles by several inventors, most notably by Wright (U.S. Pat. No. 3,598,479).

A number of problems were encountered by workers attempting to fabricate variable focus spectacles using the principle of pumping liquid into a liquid lens. Among these were leakage, the difficulty of moving sufficient liquid in a short time, and annoying transient optical distortions caused by the streaming liquid.

Gordon (U.S. Pat. No. 1,269,422) disclosed radially squeezing the periphery of two abutting meniscus-shaped pieces of glass with liquid between them so as to cause the centers to bulge out, and cause a change in focal length.

Mitchell (British Patent No. 258,325) disclosed two different types of variable focal length lenses. Mitchell disclosed both pumping liquid into or out of the space between two sheets of transparent material, as previously disclosed by Ohmart, and also moving the peripheries of two spaced sheets closer or further apart, with the volume of liquid between them being fixed. The movement in this latter embodiment was accomplished by means of "a screw, lever or other suitable means". Since the volume of liquid between the sheets was fixed, moving them with respect to each other resulted in a change in curvature, and consequently, a change in the optical power or focal length of the lens.

Barnea (U.S. Pat. No. 4,913,536) also disclosed moving the peripheries of two transparent sheets closer or further apart, using a fixed volume of liquid. In addition, Barnea disclosed an actuating mechanism for the lens which involved pumping liquid (from a separate source) into or out of an "inner tube" occupying the space between the sheets at their peripheries. As the "inner tube" is inflated or deflated, the sheets move further apart or closer together, which results in a changing focal length.

The present inventors, in a copending application (Kurtin et al. U.S. patent application Ser. No. 08/226,344), have disclosed a liquid-filled variable focus lens in which a rigid lens and a distensible membrane (carried on a supporting structure) are positioned face to face and connected through a hinge. The space between the membrane and the rigid lens is filled with liquid, and a flexible seal around the periphery keeps the liquid contained. Angular motion of the membrane-carrying structure with respect to the rigid lens causes the membrane to change shape, thereby changing the focal length of the lens.

SUMMARY OF THE INVENTION

The present invention relates to liquid-filled variable focus lenses of the type that include a rigid lens and a distensible membrane moveable relative to each other axially, either uniformly around the periphery as disclosed by Mitchell and Barnea, or at one point with a hinged assembly as disclosed by Kurtin et al. In particular, what is disclosed is an actuation system for causing motion between the moveable parts of a liquid-filled variable focus lens responsive to manipulation of a finger-operated positioner.

The description herein is placed in the context of a pair of spectacles, but it will be realized that there are also other applications for the invented actuation system. As described in detail below, each lens of the spectacles includes one fixed rigid lens which has its rear surface (the surface closest to the wearer's eyes) ground to provide the wearer's distance prescription, and a liquid lens which has a distensible membrane on the front surface to provide a variable "reading addition". For convenience, the rigid lens and the liquid lens are referred to as separate lenses, even though optically the combination acts as a single lens with one fixed surface (the rear surface), and one variable surface (the distensible membrane).

It is also convenient to describe a variable focal length spectacle lens as having its rear surface ground to the wearer's distance prescription, but this need not actually be the case. For example, the distensible membrane can be made to provide, say, one to four diopters of range, in which case the rear surface would be ground with one less diopter of optical power than if the front surface had a zero to three diopter range. Furthermore, it is not always necessary that the liquid lens have the full three diopter range mentioned. Emerging presbyopes, for example, may require only two diopters of range, or less.

The present invention involves the use of a thin band captured in a track or channel extending at least partially around the periphery of each of the lens assemblies. The band drives one or more actuating mechanisms on each lens assembly which, in turn, cause relative motion between the elements of each assembly, and hence cause the focal lengths to change. The actuating mechanisms provide a mechanical advantage which make manual adjustment of the focal length easy and convenient.

DETAILED DESCRIPTION OF THE INVENTION

Figure 1:
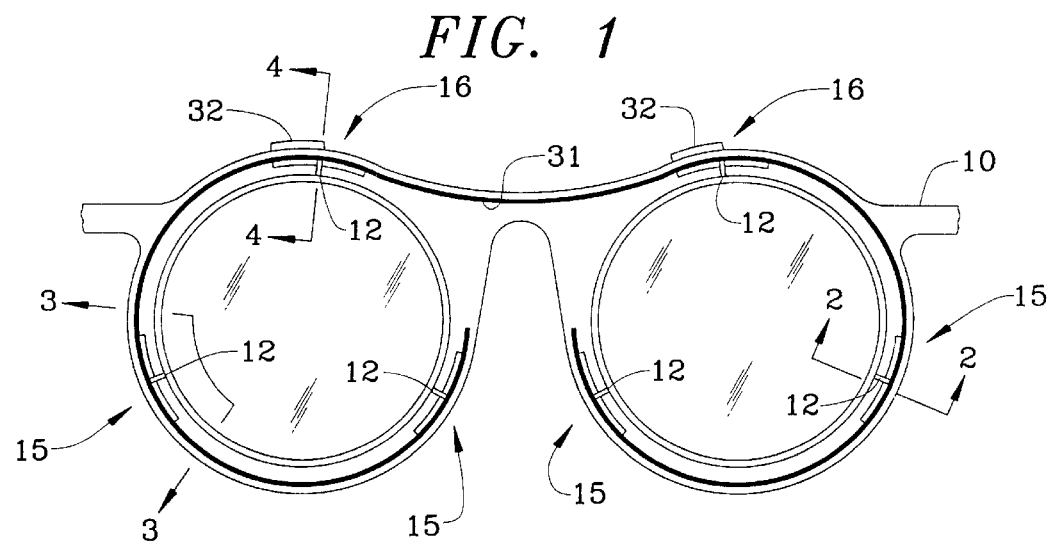
FIG. 1 is a view of a pair of spectacles using variable focus lenses according to the present invention, viewed from the wearer's side of the glasses.

FIG. 1 depicts a pair of spectacles embodying a first embodiment of the invention. The view is from the wearer side of the spectacles, and the rear frame cover 11 has been removed in this view to show the actuation mechanisms.

Figure 2:
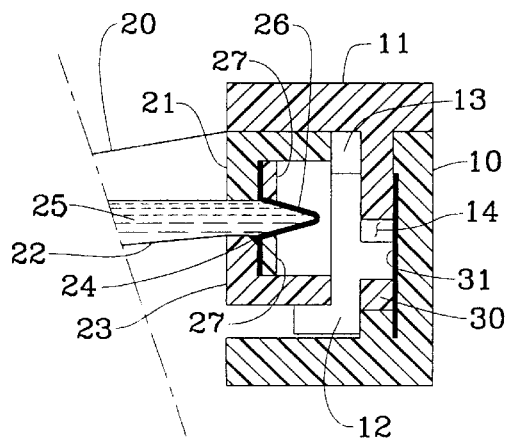
FIG. 2 is a fragmentary cross sectional view of the spectacles of FIG. 1, taken at 2—2 of FIG. 1.

The two variable focus lenses shown (including their actuation mechanisms) are mirror images, and reference to a part on one of the lenses should be understood as being a reference to both. Each lens assembly is seen in FIG. 1 held in a frame 10, spaced as needed to allow the wearer to have binocular vision. A cross sectional view of a portion of a lens assembly as it is held in the frame can be seen in FIG. 2. The lens assembly is preferably attached to the rear cover 11 of the frame by screws (not shown). The lens assembly includes a rigid lens 20 (which is held in a rear ring 21 by, for example, an epoxy adhesive), and a distensible membrane 22 (which is held onto a front ring 23 also, for example, by an epoxy adhesive). The membrane is shown in FIG. 2 somewhat distended for illustrative purposes, and the epoxy bead (24) holding it to the front ring is indicated by the black triangular area seen in the figure. During manufacture, the membrane is stretched over the ring and then secured in place with the epoxy bead (24). The space between the rigid lens 20 and membrane 22 is filled with a liquid 25 which preferably has the same index of refraction as does the material of lens 20. Liquid pressure in the lens assembly, as described later, causes the membrane to distend. The liquid 25 is retained in the assembly by a flexible seal 26 which surrounds and joins the rear and front rings. The seal 26 is held to the front and rear rings 21 and 23 by compression rings 27, the seal being compressed enough to prevent leakage. The free portion of the seal is flexible to allow relative motion between the rings. Since the liquid 25 is sensibly incompressible, as front ring 23 is made to approach rear ring 21, distensible membrane 22 is caused to distend, and the optical power of the assembly is increased.

While a number of constructional details of a representative liquid-filled variable focus lens have been described above, these details are provided for explanatory and illustrative purposes only since the present invention is not concerned with any particular design of lens assembly, but rather is concerned with an actuation system for liquid-filled variable focus lenses of any type which involves relative motion between the front and rear surfaces of the lens.

Figure 3:
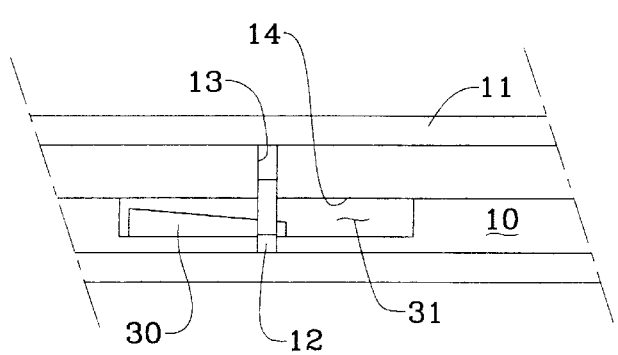
FIG. 3 is a fragmentary view of the spectacles of FIG. 1, taken at 3—3 of FIG. 1.

As shown in FIG. 1, there are three actuators associated with each lens. More than three actuators may be used, if desired, but three points of support are sufficient for stability. FIG. 2 is a section through frame 10 at the location of one of the actuators. As can be seen, the lens assembly is retained between rear cover 11 and cam followers 12 (there being a cam follower 12 at each actuator location). Each of the cam followers rides on a cam 30 which is spot welded or otherwise fastened to band 31. The cam followers ride in recesses 13 in frame 10, which restrict cam follower motion to the direction at right angles to the plane of the lens assemblies, and therefore, as the cam followers ride up cams 30 (due to movement of the cams toward the right in FIG. 3), the lens is squeezed, and membrane 22 distends. It should be noted that a substantial mechanical advantage is involved in the actuator mechanisms involved in this invention. For ease in adjustment it is preferable that the total motion applied by the user (via a finger-operated positioner to be described below) to adjust the focal length of the lens from distance to reading viewing, be of the order of 0.2 to 0.5 inches. On the other hand, the relative motion between the elements of the lens is generally of the order of 0.02 to 0.05 inches for the same range. This corresponds to a mechanical advantage between about 4 and 25. A portion of the mechanical advantage could be provided at the location where the user's input is applied, but at least the major portion is preferably provided by the mechanism which couples the band to the lens assembly, e.g., in the first embodiment described herein, by the action of cam 30 and cam follower 12.

Band 31 is a thin strip of material (a flexible elongated member) which rides in a channel in frame 10, and extends around the periphery of the lens assemblies as needed to operate the cams 30. The channel in which band 31 rides provides lateral support for the band and is made large enough so that friction is low, but not so large as to permit buckling of the band. Lateral support of the band is necessary because of the tendency of a thin member to buckle when subjected to compressive force. The maximum thickness of band 31 will depend on the friction generated as it snakes around the curves in its guiding channel. Friction can be minimized by making the channel wider than needed to accommodate the band, and including a strip of teflon, or other friction reducing material, on each side of the band. Sharper bends in the channel will require thinner bands in order to keep actuation forces low. A thickness of 0.001" to 0.003" appears to be about optimum, although under some circumstances, relatively thick bands could be practical. The band could be either metal or plastic, plastic bands generally being allowably thicker than metal bands because of the normally lower modulus of elasticity of plastics. Also, while shown as a separate part in the drawings, under some circumstances cam 30 could be integral with the band instead of being attached.

A window 14 on the interior of the lens openings in frame 10 appears at each actuator position. The cams 30 are fastened to the band within each window. To prevent buckling of the band, the windows 14 are preferably not as wide as the band 31 so that at least one edge of the band is supported.

Figure 4:
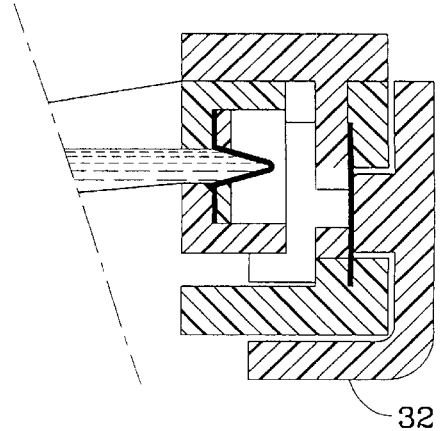
FIG. 4 is a fragmentary cross sectional view of the spectacles of FIG. 1, taken at 4—4 of FIG. 1.

A finger-operated positioner 32, located outside the frame, and preferably located at one of the actuator locations of each lens, is spotwelded, or otherwise fastened, to the band 31 as shown in FIG. 4. By moving one of the finger-operated positioners 32, the wearer can move band 31 so as to adjust the location of cams 30, and thereby adjust the focal length of the lenses as desired.

Instead of attaching the cams 30 to band 31 as described, an alternate construction is to machine (or attach) the cam on the ring 23, and engage the cam with a cam follower pin projecting from band 31. As another alternate, if desired, the cams 31 could be engaged by a pin extending out from the ring 23. Such a pin would act as a cam follower, and cause the ring to move in response to movement of the cams 31. Means to resist circumferential torques on the rear ring, as accomplished by cam follower 12 in the first embodiment described, should preferably be provided. Such means are well within the skill of ordinary workers in the art.

Figure 5:
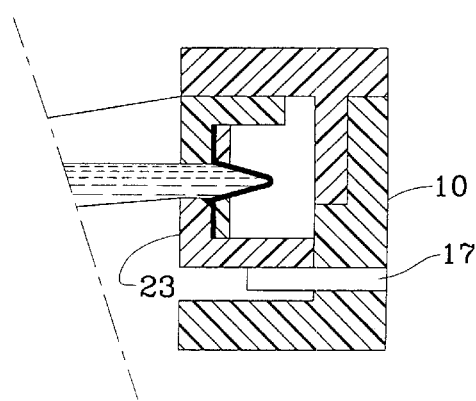
FIG. 5 is a fragmentary cross sectional view of an alternate construction of the spectacles of FIG. 1, taken at 2—2 of FIG. 1.

The first embodiment of the invention as has been described above involves the use of three actuators in order to provide a stable base for the membrane support. These actuators, which comprise means for coupling the motion of band 31 to the variable focus lens, change the spacing between the rigid lens 20 and the distensible membrane 22 responsive to displacement of the band by positioners 32. Ordinarily (but not necessarily) the three actuators each move the ring 23 an equal amount, and the distensible membrane remains substantially parallel to the rigid lens as it moves. However, a second embodiment of the invention can be realized by replacing one or two of the three actuators by hinges so that the ring 23 moves angularly with respect to the rigid lens instead of moving in a translational mode. For example, the actuators denoted by the numeral 15 in FIG. 1 could be replaced by fixed supports against which the ring 23 bears, and the ring motion provided only by the actuators denoted by the numeral 16. In such a configuration, the motion of the ring 23 is angular in nature, and the actuating band 31 need extend only between the two finger-operated positioners. The supports (i.e. hinges) at the locations 15 could merely be pins through the frame 10 which engage the ring 23, as shown in FIG. 5 as pin 17. A more sophisticated type of hinging could also be used; however, for cosmetic reasons, it is preferred that whatever hinging means is used, that it not require additional thickness of the frame. It may be noted that the term "hinge" and its derivatives are used in this application in the broad sense of a structure which restrains rectilinear motion (at least in one direction) but permits angular motion.

Figure 6:
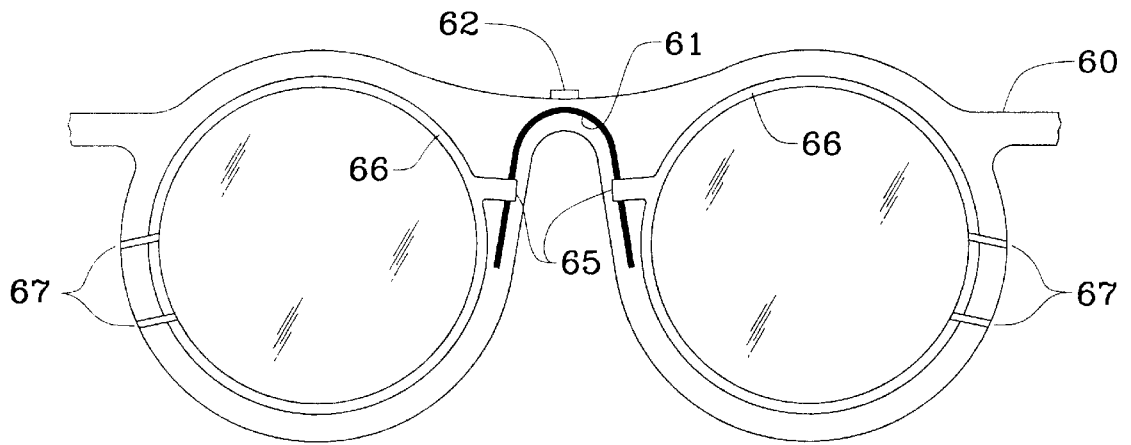
FIG. 6 is a view of a pair of spectacles using variable focus lenses according to another embodiment of the present invention, viewed from the wearer's side of the glasses.
Figure 7:
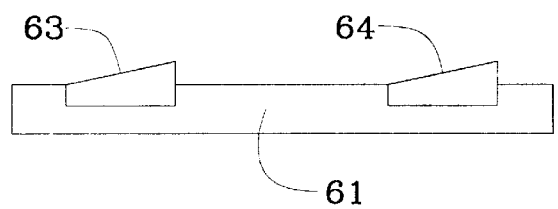
FIG. 7 is a developed side view of an actuating band as used in the embodiment of FIG. 6.

A variant of the embodiment described in the previous paragraph is illustrated in FIGS. 6 and 7. In this embodiment, a single finger-operated positioner 62 is located over the nose bridge of frame 60, and is connected to band 61, which slides in a channel in the same manner as band 31 of the first embodiment. The band 61 carries two cams 63 and 64 which engage tabs 65 on the front rings 66. The rear rings have been removed in FIG. 6 so that the front rings can be clearly seen. Pins 67 act as hinges in the same manner as pins 17 described in connection with the embodiment of the previous paragraph. It may be noted that the pins 67 in FIG. 6 have been made visible for explanatory purposes; the pins are actually behind the rings 66 and should not be visible in the figure. As the finger-operated positioner 62 is slid back and forth, the cams 63 and 64 cause the tabs 65 to move, and thereby change the focal lengths of the lenses. The cams 63 and 64 are preferably made thicker than the band 61 so as to reduce the stress between the cams and the tabs 65.

Figure 8:
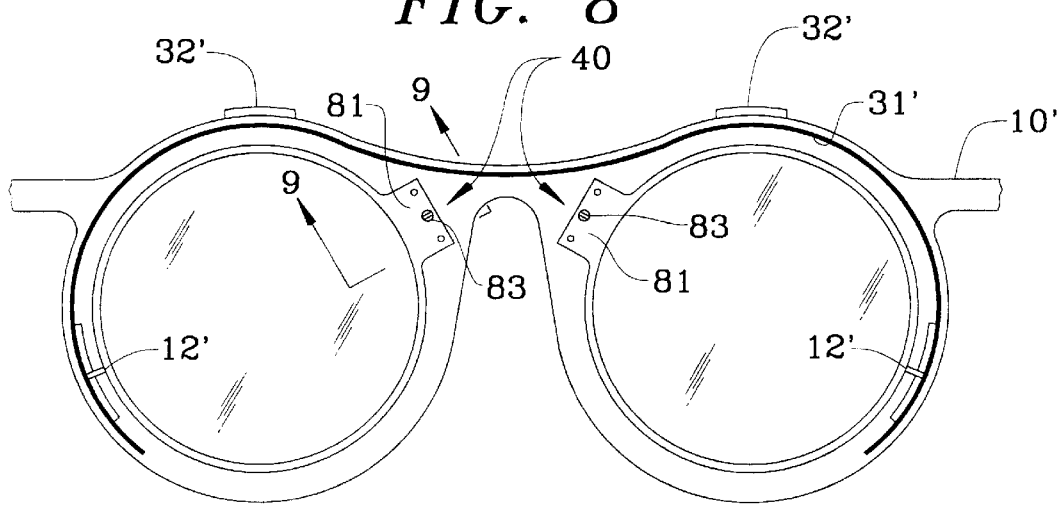
FIG. 8 is a view of a pair of spectacles using variable focus lenses according to still another embodiment of the present invention, viewed from the wearer's side of the glasses.

A fourth embodiment of the invention is illustrated in FIG. 8. The actuation motion is shown in this figure as being applied at a single point on each lens, the lens elements being hinged at a location 40 remote from the actuation point. This embodiment is very similar in principle to the embodiment illustrated in FIG. 6, the principal difference being that the hinge has been moved to an area where there is more room available without having to pay a cosmetic price.

The actuation mechanism illustrated in FIG. 8 is identical with that illustrated in FIG. 1, except that in FIG. 8, only one actuator per lens is required, as opposed to three or more per lens in the embodiment of FIG. 1. Parts appearing in FIG. 8 are assigned the same numbers as their counterparts in FIG. 1, except that a prime is attached.

Figure 9:
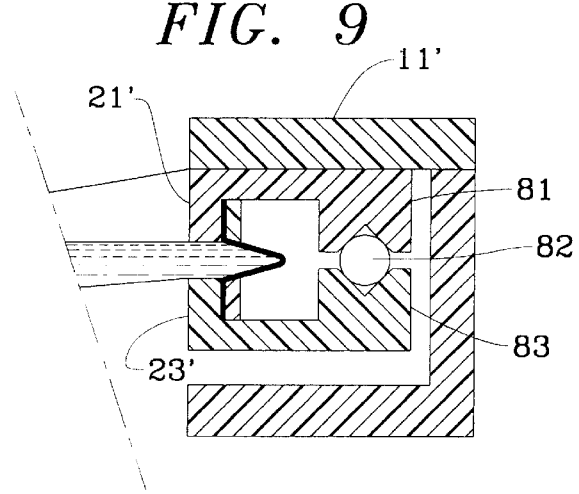
FIG. 9 is a fragmentary cross sectional view of the spectacles of FIG. 8, taken at 9—9 of FIG. 8.

Details of a presently preferred hinging means for the embodiment illustrated in FIG. 8 are illustrated in FIG. 9. A pair of ears 81 extend outward from the front and rear rings 23' and 21' near the nasal region of the lenses. Each ear includes two spaced conical depressions. The depressions are located such that a pair of balls 82 between the rings will rest in the depressions and space the rings. In order to provide for some locational inaccuracy of the conical depressions, one of the four depressions may be in the form of a flat bottomed hole having a diameter and depth such that locational tolerances are accommodated. The rings are held together by a screw 83 (preferably plastic) located between the balls. Plastic screws are preferred to metal because the permissible strain of plastics is ordinarily much higher than of metals. Permissible strain in a material is equal to the ratio of the modulus of elasticity to permissible stress, and that ratio in metals is so high, that with the range of angular motion required in this application (generally of the order of 1°) the allowable bending stress in the screw will be exceeded in metal screws of practical size. If screw materials having a ratio of modulus of elasticity to the maximum allowable bending stress of 50 or less are used, it will be found that the required bending can be tolerated. Many plastics meet this criterion.

Figure 10:
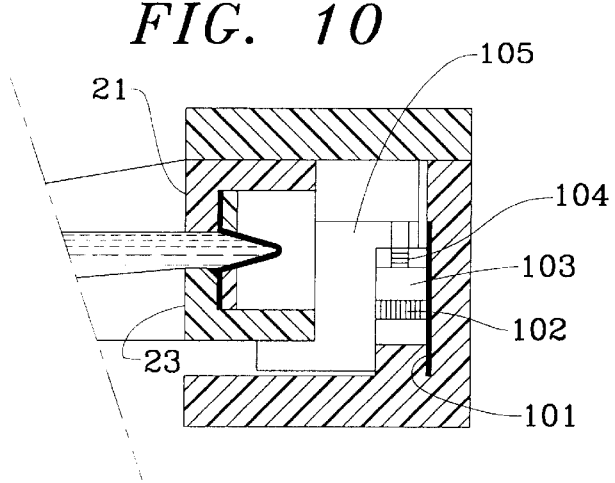
FIG. 10 is a fragmentary cross sectional view of a second form of actuator according to the present invention. The view is taken from the same vantage point as FIG. 2.
Figure 11:
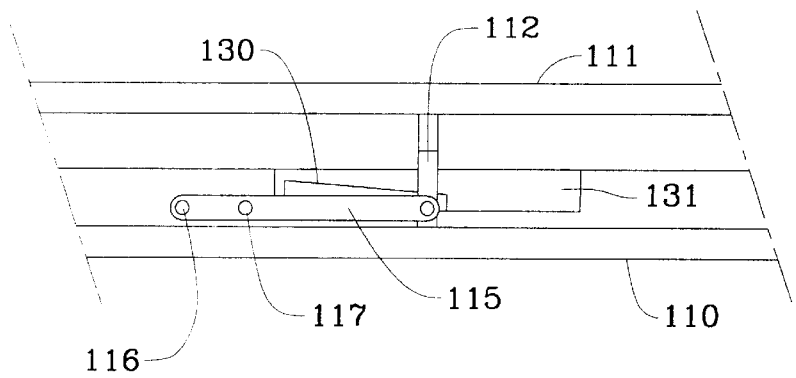
FIG. 11 is a fragmentary view of a third form of actuator according to the present invention. The view is taken from the same vantage point as FIG. 3.

FIGS. 10 and 11 illustrate two additional actuating mechanisms for coupling a band to a front ring 23 so as to translate the motion of finger-operated positioner 32 into motion of the ring with the appropriate mechanical advantage.

The band 101 in the actuator of FIG. 10 contains a series of sprocket holes along its length which are engaged by teeth 102 on sprocket wheel 103. The sprocket wheel 103 is threaded internally, and threaded stud 104, which is pressed into follower 105, mates therewith. It can be seen that when the band is moved, the sprocket wheel 103 turns, and threaded stud 104 causes the follower 105 to move linearly. This motion is imparted to the front ring 23, changing the separation between it and rear ring 21, and, as previouly described, the focal length of the lens.

A portion of the required mechanical advantage between the finger-operated positioner and the lens rear ring is obtained in the actuator of FIG. 11 by coupling a lever 115 to the follower 112. Lever 115 is pivotted at 116, and a pin 117 engages the front ring. The follower 112 rides on cam 130, which is driven by band 131. The use of a lever in combination with a cam to provide the desired mechanical advantage may be significant in that such a construction can reduce the positional accuracy required of the cam. In spectacles, the positions of the two membrane supports relative to their associated rigid lenses must track to a relatively high accuracy in order for the lens assemblies to have their optical powers track within the required tolerances (ordinarily about ⅛ Diopter). Specifically, tracking to within 0.001 inches or even less may be required. The use of a lever with a mechanical advantage of, say, three, would increase the allowable cam fabrication and installation tolerances by about the same factor of three. This is true because of the ease with which levers having a very high mechanical advantage accuracy can be made.

While the above description utilizes several embodiments of the invention for the purpose of explaining its principles, the invention is not intended to be limited to the embodiments shown. It is apparent that persons skilled in the art can devise many other embodiments which fall within the scope of the invention, as defined by the following claims.

We claim:

1. In a variable focus lens of the type having a lens assembly comprising a rigid lens, a distensible membrane spaced from said rigid lens, and liquid filling the space between said rigid lens and said distensible membrane, where the focal length of said variable focus lens is varied by changing the spacing between said rigid lens and said distensible membrane, an actuation system which comprises:

a finger operated positioner;

a flexible elongated operating member moveable lengthwise responsive to movement of said finger operated positioner;

a supporting structure for said flexible elongated operating member for preventing compressive buckling; and actuator means responsive to movement of said elongated operating member for causing said spacing between said rigid lens and said distensible membrane to change.

2. In a variable focus lens as recited in claim 1 wherein said flexible elongated member is a thin elongated band, and said supporting structure supports said band at least along one edge thereof.

3. In a variable focus lens as recited in claim 1 wherein said actuator means comprises at least one mechanism which provides a mechanical advantage.

4. In a variable focus lens of the type having a lens assembly comprising a rigid lens, a distensible membrane spaced from said rigid lens, and liquid filling the space between said rigid lens and said distensible membrane, where the focal length of said variable focus lens is varied by changing the spacing between said rigid lens and said distensible membrane, an actuation system which comprises:

a finger operated positioner;

a flexible elongated operating member moveable lengthwise responsive to movement of said finger operated positioner;

a supporting structure for said flexible elongated operating member for preventing compressive buckling; and actuator means responsive to movement of said elongated operating member for causing said spacing between said rigid lens and said distensible membrane to change, said actuator means comprising at least one mechanism which provides a mechanical advantage and includes a cam and follower.

5. In a variable focus lens as recited in claim 4 wherein each of said cams and followers provide a mechanical advantage between about four and about twenty.

6. In a variable focus lens as recited in claim 4 and further including a lever associated with each of said mechanisms, said followers being coupled to said lens assembly through said levers.

7. In a variable focus lens as recited in claim 1 wherein said rigid lens and said distensible membrane are hingedly coupled.

8. In a variable focus lens as recited in claim 7 wherein said flexible elongated member is a thin elongated band, and said supporting structure supports said band at least along one edge thereof.

9. In a variable focus lens as recited in claim 7 wherein said actuator means comprises a mechanism which provides a mechanical advantage.

10. In a variable focus lens of the type having a lens assembly comprising a rigid lens, a distensible membrane spaced from and hingedly coupled to said rigid lens, and liquid filling the space between said rigid lens and said distensible membrane, where the focal length of said variable focus lens is varied by changing the spacing between said rigid lens and said distensible membrane, an actuation system which comprises:

a finger operated positioner;

a flexible elongated operating member moveable lengthwise responsive to movement of said finger operated positioner;

a supporting structure for said flexible elongated operating member for preventing compressive buckling; and actuator means responsive to movement of said elongated operating member for causing said spacing between said rigid lens and said distensible membrane to change, said actuator means comprising a mechanism which provides a mechanical advantage and includes a cam and follower.

11. In a variable focus lens as recited in claim 10 wherein said cam and follower provides a mechanical advantage between about four and about twenty.

12. In a variable focus lens of the type having a lens assembly comprising a rigid lens, a distensible membrane spaced from and hingedly coupled to said rigid lens, and liquid filling the space between said rigid lens and said distensible membrane, where the focal length of said variable focus lens is varied by changing the spacing between said rigid lens and said distensible membrane, an actuation system which comprises:

a finger operated positioner;

a flexible elongated operating member moveable lengthwise responsive to movement of said finger operated positioner;

a supporting structure for said flexible elongated operating member for preventing compressive buckling; and actuator means responsive to movement of said elongated operating member for causing said spacing between said rigid lens and said distensible membrane to change, said actuator means comprising a mechanism which provides a mechanical advantage and includes a cam, a follower, and a lever, said follower being coupled to said lens assembly through said lever.

13. In a variable focus lens as recited in claim 12 wherein said mechanism includes a threaded member and said flexible elongated member rotates said threaded member.

14. A variable focus lens which comprises:

a rigid lens having a field of view;

a membrane support spaced from said rigid lens;

flexible sealing means extending between said rigid lens and said membrane support allowing relative motion between said rigid lens and said membrane support;

a transparent membrane positioned across the field of view of said rigid lens and spaced from said rigid lens, and sealed around its periphery to said membrane support;

a transparent liquid filling said space between said rigid lens and said membrane;

three or more actuators acting between said rigid lens and said membrane support at spaced points around the periphery of said variable focal length lens; and manually operated means for simultaneously causing each of said actuators to change the spacing between said rigid lens and said membrane support at locations adjacent to said actuators.

15. A variable focus lens as recited in claim 14 wherein said manually operated means comprises:

a flexible elongated operating member;

a supporting structure for said flexible elongated operating member for preventing compressive buckling;

a finger-operated positioner coupled to said operating member;

and wherein said three or more actuators comprises:
three or more actuating mechanisms which provide mechanical advantage and are coupled to said flexible elongated operating member.

16. A variable focus lens as recited in claim 15 wherein said flexible elongated member is a thin elongated band, and said supporting structure supports said band at least along one edge thereof.

17. A variable focus lens as recited in claim 14 wherein said actuators include a cam and follower.

18. In a variable focus lens as recited in claim 17 wherein said cam and follower provide a mechanical advantage between about four and about twenty.

19. A variable focus lens as recited in claim 17 wherein said actuators further include a lever.

20. A variable focus lens as recited in claim 14 wherein said manually operated means rotates a threaded member.

21. A variable focus lens which comprises:

a rigid lens having a field of view;

a membrane support spaced from said rigid lens and hingedly coupled thereto;

sealing means extending between said rigid lens and said membrane support, said sealing means being flexible to allow relative motion between said rigid lens and said membrane support;

a transparent membrane positioned across said field of view of said rigid lens and spaced from said rigid lens, and sealed around its periphery to said membrane support;

a transparent liquid filling the space between said rigid lens and said membrane;

a flexible elongated operating member;

a supporting structure for said flexible elongated operating member for preventing compressive buckling;

a finger-operated positioner coupled to said operating member for moving said operating member lengthwise;

actuator means responsive to movement of said flexible elongated operating member for adjusting the spacing between said rigid lens and said transparent membrane.

22. A variable focus lens as recited in claim 21 wherein said flexible elongated member is a thin elongated band, and said supporting structure supports said band at least along one edge thereof.

23. In a variable focus lens as recited in claim 22 wherein said actuator means further includes a lever.

24. A variable focus lens as recited in claim 21 wherein said actuator means includes a threaded member.

25. In a variable focus lens of the type having a lens assembly comprising a rigid lens, a distensible membrane spaced from said rigid lens, and liquid filling the space between said rigid lens and said distensible membrane, where the focal length of said variable focus lens is varied by changing the spacing between said rigid lens and said distensible membrane, an actuation system which comprises:

a finger operated positioner;

a flexible elongated operating member moveable lengthwise responsive to movement of said finger operated positioner;

a supporting structure for said flexible elongated operating member for preventing compressive buckling; and actuator means responsive to movement of said elongated operating member for causing said spacing between said rigid lens and said distensible membrane to change, said actuator means comprising at least one mechanism which provides a mechanical advantage and includes a threaded member, said flexible elongated member causing said threaded member to rotate.

26. A variable focus lens which comprises:

a rigid lens having a field of view;

a membrane support spaced from said rigid lens and hingedly coupled thereto;

sealing means extending between said rigid lens and said membrane support, said sealing means being flexible to allow relative motion between said rigid lens and said membrane support;

a transparent membrane positioned across said field of view of said rigid lens and spaced from said rigid lens, and sealed around its periphery to said membrane support;

a transparent liquid filling the space between said rigid lens and said membrane;

a flexible elongated operating member comprised of a thin elongated band;

a supporting structure which supports said band at least along one edge thereof for preventing compressive buckling;

a finger-operating positioner coupled to said operating member for moving said operating member lengthwise;

actuator means, including a cam and follower, responsive to movement of said flexible elongated operating member for adjusting the spacing between said rigid lens and said transparent membrane.

27. In a variable focus lens as recited in claim 26 wherein said cam and follower provide a mechanical advantage between about four and about twenty.

* * * * *